UNITED STATES PATENT OFFICE.

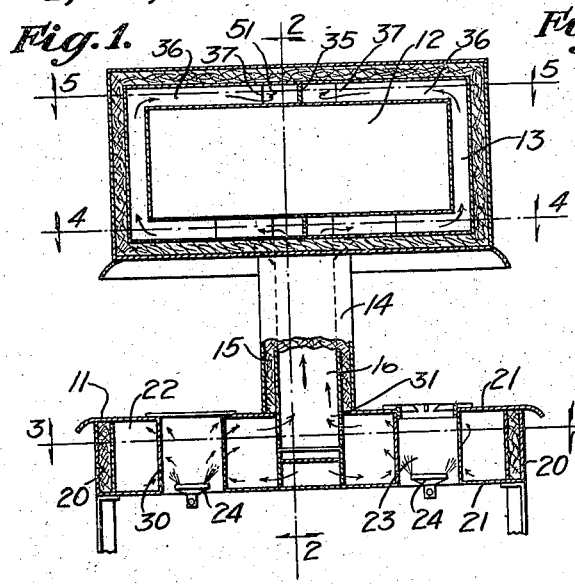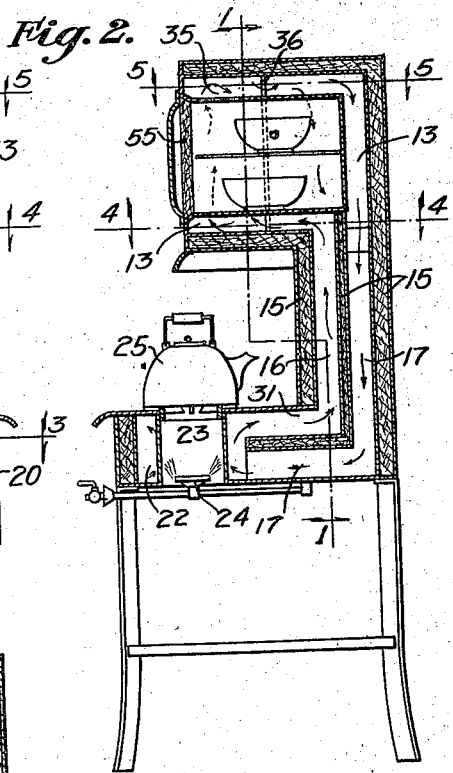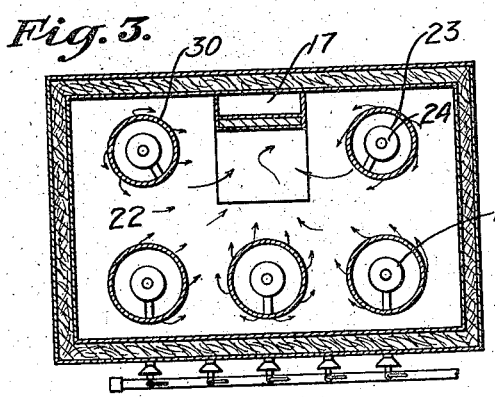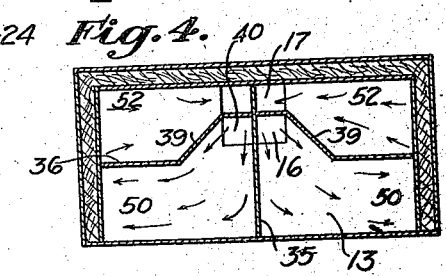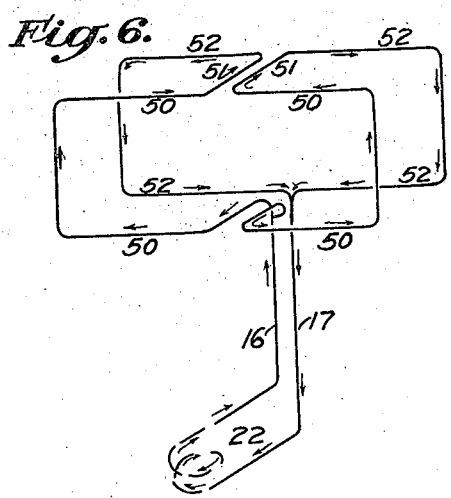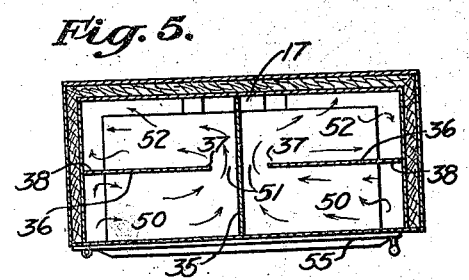

IVAN KING, OF LOS ANGELES, CALIFORNIA.

STOVE.

1,425,780.

Specification of Letters Patent.  Patented Aug. 15, 1922.

Application filed April 6, 1921. Serial No. 458,967.

*To all whom it may concern:*

Be it known that I, IVAN KING, a citizen of the United States, residing at Los Angeles, county of Los Angeles, and State of California, have invented a new and useful Stove, of which the following is a specification.

This invention relates to the manufacture of stoves, and particularly to those classes of stoves known as gas ranges or gas plates, and to their application in the preparation of foods.

The present type of these stoves are furnished with burners which deliver spreading flames up and around the sides of the cooking utensils, whereby a considerable wastage of heat results.

It is an object of my invention to provide a stove in which the heat which is ordinarily wasted may be used to heat an oven which is so constructed that the heat delivered thereto is stored, thereby providing a fireless cooker which will be in condition for use at all times whether the stove is otherwise in use or not.

It is a further object of my invention to provide a construction whereby such a fireless cooking chamber may be incorporated with a gas plate, or other stove.

Referring to the drawing which is for illustrative purposes only and presents merely one embodiment of my invention:

Fig. 1 is a vertical longitudinal section of a stove in which one embodiment of my invention is incorporated, and is taken on a bent plane as indicated by the line 1—1 of Fig. 2.

Fig. 2 is a vertical cross-section of the stove taken on a plane represented by the line 2—2 of Fig. 1.

Fig. 3 is a section on a plane represented by the line 3—3 of Fig. 1.

Fig. 4 is a section on a plane represented by the line 4—4 of Fig. 1.

Fig. 5 is a section taken on a plane represented by the line 5—5 of Fig. 1.

Fig. 6 is an isometric line diagram illustrating the flow of heated air around the fireless cooking chamber.

Similar parts are represented by similar characters throughout the several views of the drawing.

My invention comprises essentially a plate 11, a cooking chamber 12, a surrounding heated air circulating chamber 13, and a column 14 composed of insulated walls 15 which provide flues 16 and 17 and adapted to support said cooking chamber.

The plate 11 consists of side walls 20 and top and bottom members 21 thereby forming a chamber 22 in which are a number of burner flues 23 having located in the lower portions thereof burners 24. It will be noticed that as the burners are situated in the lower part of the burner flues the heat from the flames thereof is confined by the walls of the flues and directed upwardly against the bottoms of whatever utensils 25 may be in use. The walls 30 which form the burner flues 23 are preferably of sheet metal through which a certain portion of the heat from the burners 24 is transmitted into the interior air of the chamber 22. This interior air becoming heated rises within the chamber and seeks an outlet with the result that it passes into the vertical flue 16 which joins with the chamber 22 in the upper portion thereof as indicated at 31.

The heat circulating chamber 13 surrounding the cooking chamber 12 is divided into flues for controlling the circulation of heated air by a partition wall 35 extending centrally across the upper portion of the circulating chamber 13, down the rear portion of the circulating chamber, and forwardly across the lower portion thereof dividing same into two distinct parts. Further division is made by partition walls 36 which extend outwardly from positions as indicated at 37 in Fig. 5, across the upper portion of the circulating chamber, down the sides of the chamber as indicated at 38, and inwardly across the lower portion of the circulating chamber, dropping to the rear, as indicated at 39 in Fig. 4, to include the mouth 40 of the flue 16 within the forward division 50 of the chambers formed by the partition walls 36.

With especial reference to the diagram Fig. 6 in which the circulating chambers are represented by single lines and the direction of air flow indicated by arrows; the air heated by the radiation through the flue walls 30 rises through the flue 16, as hereinbefore mentioned, and through the flue mouth 40 enters and passes forwardly and outwardly in two streams through the lower portion of the heat circulating chambers 50, rising through the side portions thereof into the upper part. Through the openings 51 formed between the ends 37 of the partition walls 36 and the partition wall 35, as shown in Fig. 5, the heated air enters the rear circulating chamber 52 and passes outwardly and downwardly through the side and rear portions into the lower portion thereof, from whence it returns through the flue 17 to the chamber 22 in a somewhat cooled condition and ready to be reheated by the radiation through the burner flue walls. It will be perceived that the flow of heated air around the outside of the cooking chamber 12 is in such a manner as to provide an equal amount of heat on both sides of the chamber as well as the introduction of heat thereinto from the bottom, top and sides, and that a continuous circulation of heat is maintained around the cooking chamber during such times as the burners 24 in the plate 11 are in operation.

The outer walls and the door 55 of the stove are preferably insulated with asbestos in order that the ultimate amount of heat may be retained within the different compartments thereof, and an economy of operation thereby attained.

I claim as my invention:

1. In combination; walls forming an oven; walls forming a combustion space open at the top; walls forming an enclosed chamber about said oven; walls forming an enclosed chamber about said combustion space; and walls forming passages through which heated air may be transferred from said space about said combustion space to the space about said oven.

2. In combination; walls forming an oven; walls forming a combustion space open at the top; walls forming an enclosed chamber about said oven; walls forming an enclosed chamber about said combustion space; walls forming a passage through which heated air may rise from said space about said combustion space into the space about said oven; and walls forming a passage through which cooled air may fall from said space about said oven to said space about said combustion space.

3. In combination; walls forming an oven; walls forming a combustion space open at the top; walls forming an enclosed chamber about said oven; walls forming an enclosed chamber about said combustion space; and walls forming two separate passages between said space about said combustion space and said space about said oven.

4. In combination; walls forming an oven; walls forming a combustion space open at the top; walls forming an enclosed chamber about said oven; heat insulating and storage material surrounding said space about said oven; walls forming an enclosed chamber about said combustion space; and walls forming passages through which heated air may be transferred from said space about said combustion space to the space about said oven.

5. In combination; walls forming an oven; walls forming a combustion space open at the top; walls forming an enclosed chamber about said oven; heat insulating and storage material surrounding said space about said oven; walls forming an enclosed chamber about said combustion space; walls forming a passage through which heated air may rise from said space about said combustion space into the space about said oven; and walls forming a passage through which cooled air may fall from said space about said oven to said space about said combustion space.

6. In combination; walls forming an oven; walls forming a combustion space open at the top; walls forming an enclosed chamber about said oven; heat insulating and storage material surrounding said space about said oven; walls forming an enclosed chamber about said combustion space; and walls forming two separate passages between said space about said combustion space and said space about said oven.

7. In combination; walls forming an oven; walls forming an enclosed chamber about said oven; walls enclosing a combustion space; a burner in the lower portion of said combustion space; means for supporting a utensil over the open upper end of said combustion space; walls forming an enclosed chamber around said combustion space; and means for transferring hot gases from said enclosed chamber about said combustion space to said enclosed chamber about said oven.

In testimony whereof, I have hereunto set my hand at Los Angeles, California, this 28th day of March 1921.

IVAN KING.